United States Patent
Ryu et al.

(10) Patent No.: US 11,524,277 B2
(45) Date of Patent: Dec. 13, 2022

(54) CATALYST FOR MASS PRODUCTION OF MULTI-WALL CARBON NANOTUBES

(71) Applicant: KOREA KUMHO PETROCHEMICAL CO., LTD., Seoul (KR)

(72) Inventors: Sang Hyo Ryu, Seoul (KR); Hyun Kyung Sung, Daejeon (KR); Chung Heon Jeong, Daejeon (KR); Dong Hwan Kim, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 269 days.

(21) Appl. No.: 16/490,765

(22) PCT Filed: Mar. 2, 2018

(86) PCT No.: PCT/KR2018/002549
§ 371 (c)(1),
(2) Date: Sep. 3, 2019

(87) PCT Pub. No.: WO2018/160042
PCT Pub. Date: Sep. 7, 2018

(65) Prior Publication Data
US 2020/0078772 A1  Mar. 12, 2020

(30) Foreign Application Priority Data

Mar. 3, 2017 (KR) .................. 10-2017-0027853
Feb. 28, 2018 (KR) .................. 10-2018-0024482

(51) Int. Cl.
*B01J 35/08* (2006.01)
*B01J 23/78* (2006.01)
(Continued)

(52) U.S. Cl.
CPC .......... *B01J 23/78* (2013.01); *B01J 23/8472* (2013.01); *B01J 23/881* (2013.01); *B01J 23/882* (2013.01);
(Continued)

(58) Field of Classification Search
None
See application file for complete search history.

(56) References Cited

U.S. PATENT DOCUMENTS

| 9,006,132 B2 * | 4/2015 | Ryu ....................... B82Y 30/00 |
| | | 502/328 |
| 2011/0212016 A1 * | 9/2011 | Lee .......................... B01J 35/08 |
| | | 423/447.3 |
| 2012/0040186 A1 | 2/2012 | Ryu et al. |

FOREIGN PATENT DOCUMENTS

| JP | 2015-529157 A | 10/2015 |
| JP | 2016-501813 A | 1/2016 |

(Continued)

*Primary Examiner* — Coris Fung
*Assistant Examiner* — Keling Zhang
(74) *Attorney, Agent, or Firm* — Novick, Kim & Lee PLLC; Jae Youn Kim

(57) ABSTRACT

Provided is a catalyst for manufacturing multi-wall carbon nanotubes, the catalyst including metal components according to <Equation> Ma:Mb=x:y, and having a hollow structure with a thickness of 0.5-10 μm. In the above equation, Ma represents at least two metals selected from Fe, Ni, Co, Mn, Cr, Mo, V, W, Sn, and Cu; Mb represents at least one metal selected from Mg, Al, Si, and Zr; x and y each represent the molar ratio of Ma and Mb; and x+y=10, $2.0 \leq x \leq 7.5$, and $2.5 \leq y \leq 8.0$.

9 Claims, 2 Drawing Sheets

(51) Int. Cl.
   *B01J 23/881* (2006.01)
   *B01J 23/847* (2006.01)
   *B01J 23/882* (2006.01)
   *B01J 23/888* (2006.01)
   *B01J 35/00* (2006.01)
   *B01J 37/10* (2006.01)
   *C01B 32/162* (2017.01)

(52) U.S. Cl.
   CPC ............ *B01J 23/888* (2013.01); *B01J 35/008* (2013.01); *B01J 35/0026* (2013.01); *B01J 35/08* (2013.01); *B01J 37/105* (2013.01); *C01B 32/162* (2017.08); *C01B 2202/06* (2013.01); *C01B 2202/34* (2013.01); *C01B 2202/36* (2013.01); *C01P 2002/74* (2013.01); *C01P 2006/10* (2013.01)

(56) References Cited

FOREIGN PATENT DOCUMENTS

| | | |
|---|---|---|
| KR | 10-1007183 B1 | 1/2011 |
| KR | 10-2012-0021581 A | 3/2012 |
| KR | 10-1241034 B1 | 3/2013 |
| KR | 10-2013-0094364 A | 8/2013 |
| KR | 10-1303061 B1 | 9/2013 |
| KR | 10-1508101 B1 | 4/2015 |

\* cited by examiner

CATALYST FOR MASS PRODUCTION OF MULTI-WALL CARBON NANOTUBES

TECHNICAL FIELD

The present invention relates to a catalyst for the mass production of multi-walled carbon nanotubes.

BACKGROUND ART

Carbon nanotubes, which are tube-shaped materials having a hexagonal honeycomb pattern in which one carbon atom is bonded to three other carbon atoms, have excellent electrical, thermal, and mechanical properties compared to other materials and thus have been applied to various industrial fields.

Such carbon nanotubes are generally prepared by various methods such as arc-discharge, pyrolysis, laser vaporization, chemical vapor deposition, plasma chemical vapor deposition, thermal chemical vapor deposition, chemical vapor condensation, and the like.

Until now, catalysts for carbon nanotube preparation having various combinations of metal components and various physical properties have been developed. However, most of them were developed based on a fixed-bed chemical vapor deposition reactor which has low productivity and synthesizes carbon nanotubes with low uniformity, and thus are not suitable for a fluidized-bed chemical vapor deposition reactor which is advantageous for mass production and the preparation of carbon nanotubes with high uniformity.

In addition, there are also problems in that the catalysts are prepared by spray drying which is carried out at a low temperature of 200° C. to 350° C., the use of a water-soluble polymer as a pore-forming agent is essential for forming a hole in the catalysts, and it is required that a firing process is further carried out at a temperature of 350° C. to 1,100° C. in order to make the catalysts in a form suitable for synthesis, and a catalyst prepared by such spray drying has a high apparent density and thus is not suitable for a fluidized-bed reactor.

DISCLOSURE

Technical Problem

The present invention has been designed to solve the above-described problems of the prior art, and is directed to providing a catalyst suitable for a process of preparing multi-walled carbon nanotubes using a fluidized-bed reactor.

Technical Solution

One aspect of the present invention provides a catalyst for preparing multi-walled carbon nanotubes, the catalyst containing metal components according to the following Equation and having a hollow structure with a thickness of 0.5 μm to 10 μm:

$$Ma:Mb=x:y \qquad \text{<Equation>}$$

In Equation, Ma represents two or more types of metals selected from among Fe, Ni, Co, Mn, Cr, Mo, V, W, Sn, and Cu, Mb represents one or more types of metals selected from among Mg, Al, Si, and Zr, x and y represent the mole fractions of Ma and Mb, respectively, and x+y=10, $2.0 \leq x \leq 7.5$, and $2.5 \leq y \leq 8.0$.

According to one embodiment, the catalyst may have an apparent density of 0.05 g/mL to 0.70 g/mL.

According to one embodiment, the thickness may be 1 μm to 8 μm.

According to one embodiment, the hollow structure may have a hollow ratio of 50 vol % or more.

Another aspect of the present invention provides a carbon nanotube aggregate, which includes a bundle-type carbon nanotube consisting of a plurality of multi-walled carbon nanotubes grown on the catalyst for preparing multi-walled carbon nanotubes.

According to one embodiment, the bundle-type carbon nanotube may have an average bundle diameter of 0.5 μm to 20 μm and an average bundle length of 10 μm to 200 μm.

According to one embodiment, the multi-walled carbon nanotube may have an intensity ratio ($I_G/I_D$) of 0.7 to 1.5 as measured by Raman spectroscopy.

According to one embodiment, the multi-walled carbon nanotube may have an average diameter of 5 nm to 50 nm.

According to one embodiment, the multi-walled carbon nanotube may have an apparent density of 0.01 g/mL to 0.07 g/mL.

Advantageous Effects

According to one aspect of the present invention, by subjecting an aqueous catalyst solution containing all the metal components of a catalyst dissolved therein to spray pyrolysis, it is possible to prepare a catalyst having a hollow structure, that is, a spherical core-shell structure or a partially broken spherical structure, without further using a support, and by adjusting the thickness of the shell forming the hollow structure, the hollow ratio, and the density of the catalyst within a predetermined range, it is possible to optimize the composition and structure of the catalyst for a fluidized-bed reactor and thereby mass-produce multi-walled carbon nanotubes.

However, it is to be understood that the effects of the present invention are not limited to the above-described effects and include all effects deducible from the configuration of the invention described in the detailed description of the invention or in the claims.

MODES OF THE INVENTION

Figure 1:
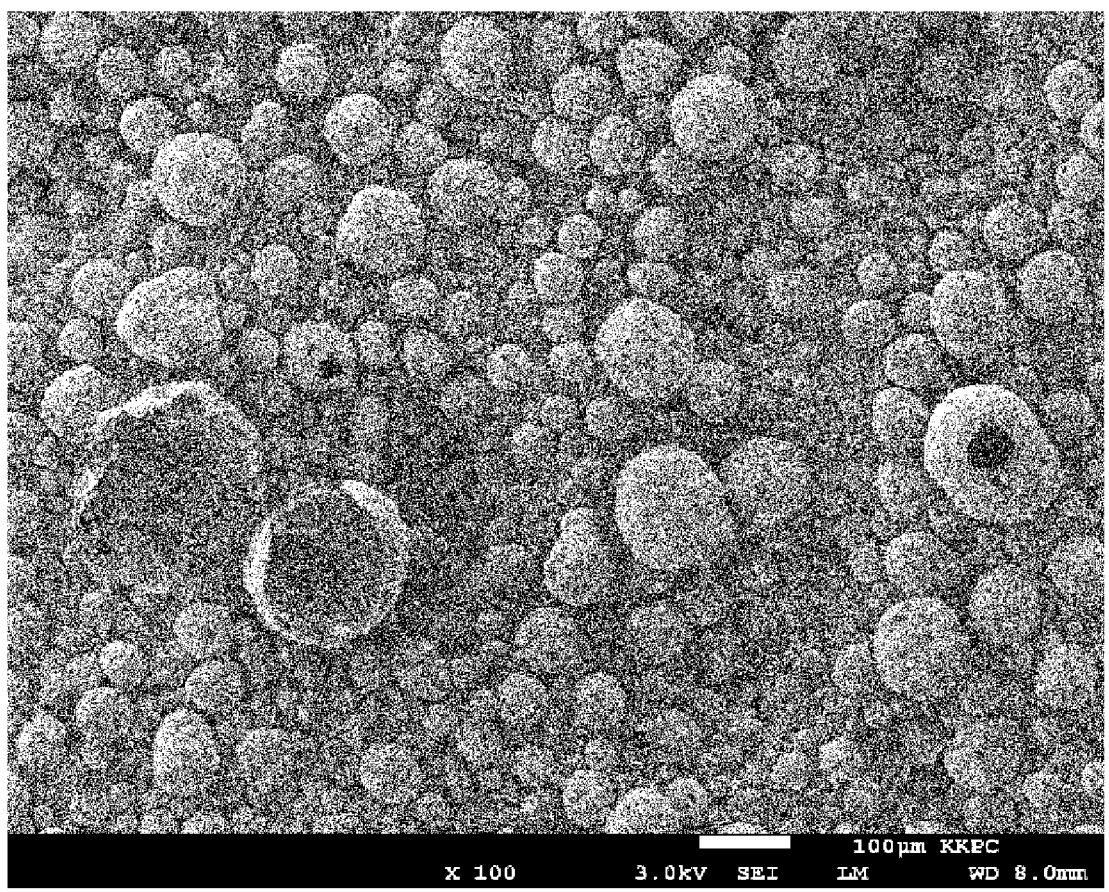
FIG. 1 is a scanning electron microscope (SEM) image of a catalyst for preparing multi-walled carbon nanotubes according to an Example of the present invention.

Hereinafter, the present invention will be described with reference to the accompanying drawings. However, it should be understood that the invention can be embodied in various forms and thus is not limited to the embodiments described herein. In addition, in order to clearly describe the invention, parts irrelevant to the description of the invention are omitted in the drawings, and like reference numerals designate like parts throughout the specification.

Throughout this specification, when a part is mentioned as being "connected" to another part, this means that the part may not only be "directly connected" to the other part but may also be "indirectly connected" to the other part through another member interposed therebetween. In addition, when a part is mentioned as "including" a specific component, this does not preclude the possibility of the presence of other component(s) in the part, which means that the part may further include the other component(s), unless otherwise stated.

One aspect of the present invention provides a catalyst for preparing multi-walled carbon nanotubes, the catalyst containing metal components according to the following Equation and having a hollow structure with a thickness of 0.5 μm to 10 μm:

$$Ma:Mb=x:y \qquad <\text{Equation}>$$

In Equation, Ma represents two or more types of metals selected from among Fe, Ni, Co, Mn, Cr, Mo, V, W, Sn, and Cu, Mb represents one or more types of metals selected from among Mg, Al, Si, and Zr, x and y represent the mole fractions of Ma and Mb, respectively, and x+y=10, 2.0≤x≤7.5, and 2.5≤y≤8.0.

The catalyst may be used in chemical vapor condensation for synthesizing carbon nanotubes, and since Ma is two or more types of metals selected from among Fe, Ni, Co, Mn, Cr, Mo, V, W, Sn, and Cu, and Mb is one or more types of metals selected from among Mg, Al, Si, and Zr, the catalyst may contain at least three types of metals and preferably three to five types of metal components.

In particular, Ma is a catalyst component and an active component in the catalyst, and since two or more types of metal components are used in combination, the generation of impurities during the synthesis of carbon nanotubes is suppressed and thus purity can be improved compared to when only one metal component is used as the catalyst component and the active component.

As used herein, the term "catalyst component" refers to a material that substantially lowers the chemical reaction energy of a material, that is, a main catalyst, and the term "active component" refers to a material that assists the action of the catalyst component, that is, a cocatalyst. When the catalyst component and the active component are in a uniform distribution within a certain range, the synthesis yield of carbon nanotubes can be improved.

The relationship between x and y, which are the mole fractions of Ma and Mb, respectively, may satisfy 2.0≤x≤7.5 and 2.5≤y≤8.0. When x is less than 2.0, catalyst activity and accordingly the synthesis yield of carbon nanotubes may be lowered, and when x is more than 7.5, since the content of Mb, which is a support component, is relatively low, the durability of the catalyst is lowered, and therefore, there is a difficulty in applying the catalyst to the continuous-type fluidized-bed chemical vapor deposition method for the mass production of carbon nanotubes.

The catalyst may have a hollow structure with a thickness of 0.5 μm to 10 μm and preferably 1 μm to 8 μm, and the hollow ratio may be 50 vol % or more. In addition, the catalyst may have an apparent density of 0.05 g/mL to 0.70 g/mL.

As used herein, the term "hollow structure" refers to a three-dimensional structure with an empty interior, for example, a spherical or polyhedral structure with an empty interior, and may be interpreted as encompassing a closed structure having a completely closed hollow, an open structure having a partially open hollow, or a combination thereof.

In the case of a conventionally used catalyst, which is in the form of a solid sphere, there is a difficulty in applying the catalyst to the continuous-type fluidized-bed chemical vapor deposition method for the mass production of carbon nanotubes because of its high apparent density of greater than about 0.7 g/mL, and since the carbon nanotubes grow only on the outer surface of the catalyst, there is a difficulty in improving the yield to or above a certain level.

On the other hand, since the catalyst has a low apparent density compared to a conventional catalyst due to having a hollow structure, it can be applied to the continuous-type fluidized-bed chemical vapor deposition method, and since the carbon nanotubes can grow not only in an outward direction from the outer surface of the hollow structure but also in an inward direction from the inner surface of the hollow structure, the synthesis yield of carbon nanotubes can be significantly improved.

Another aspect of the present invention provides a method of preparing a catalyst for preparing multi-walled carbon nanotubes, the method including the steps of: (a) preparing a precursor solution by dissolving a metal precursor in a solvent; and (b) forming a catalyst by subjecting the precursor solution to thermal decomposition while spraying the same into a reactor.

$$Ma:Mb=x:y \qquad <\text{Equation 1}>$$

In the above Equation, Ma represents two or more types of metals selected from among Fe, Ni, Co, Mn, Cr, Mo, V, W, Sn, and Cu, Mb represents one or more types of metals selected from among Mg, Al, Si, and Zr, x and y represent the mole fractions of Ma and Mb, respectively, and x+y=10, 2.0≤x≤7.5, and 2.5≤y≤8.0.

In the step (a), a precursor solution for each metal element constituting the catalyst may be prepared. The metal precursor may be one selected from the group consisting of a metal nitrate, a metal sulfate, a metal alkoxide, a metal chloride, a metal acetate, a metal carbonate, and a mixture of two or more thereof, but the present invention is not limited thereto.

In the step (a), the solvent may be a polar solvent, and as the polar solvent, water, methanol, ethanol, propanol, isopropanol, butanol, or a mixture of two or more thereof may be used, water is preferably used, and deionized water is more preferably used.

When dissolving each precursor for the preparation of the precursor solution, the use of deionized water as the solvent can minimize impurities in the precursor solution and accordingly improve the purity of the catalyst finally prepared. The improved purity of the catalyst may ultimately mean the improved purity of the carbon nanotubes.

In the step (b), a catalyst may be formed by subjecting the precursor solution to thermal decomposition while spraying the same into a reactor. The step (b) may include the steps of: (i) spraying a precursor solution into a reactor by supplying air of 2 atm to 5 atm as a carrier gas and introducing external air; and (ii) forming a catalyst by subjecting the precursor solution, which has been sprayed, to thermal decomposition at a temperature of 600° C. to 1,200° C.

In the step (i), in order to control the particle diameter, apparent density, and the like of the catalyst, the precursor solution may be converted into finer droplets by spraying the same into the reactor.

When spraying the precursor solution, the pressure may be adjusted within the range of 2 atm to 5 atm. When the spray pressure is less than 2 atm, since the particle diameter, apparent density, and the like of the catalyst cannot be adjusted within a predetermined range, the purity of the synthesized carbon nanotubes may be lowered. On the other hand, when the spray pressure is more than 5 atm, since the particle size of the droplets is excessively decreased, the obtained catalyst may form an aggregate.

As the surface tension of the precursor solution is overcome and the inertia force is more effectively transferred to the solution, the size of the droplets can be more precisely controlled, and accordingly, the particle diameter, apparent density, and the like of the catalyst can be more precisely controlled.

Accordingly, a gas may be sprayed at the same time as spraying the precursor solution to form droplets, or a gas may be sprayed after spraying the precursor solution to form droplets.

However, the size of droplets can be more precisely controlled when the precursor solution and gas are sequentially sprayed, and therefore, in the above-described method of preparing a catalyst, an additional step of spraying a gas into the reactor may be carried out before the step (ii).

In this case, as the gas, air, nitrogen, argon, or a mixed gas of two or more thereof may be used, and air is preferably used. Also, in addition to spraying the gas, electrostatic attraction may be further applied to improve the droplet formation efficiency.

In the case of further spraying a gas after spraying the precursor solution, the gas spray pressure may be adjusted within the range of 2 atm to 5 atm as in the case of spraying the gas and the precursor solution at the same time, and the effects of when the spray pressure is out of this range have been described above.

In the step (ii), a catalyst may be finally prepared by heating the droplets to evaporate the solvent and decompose the precursor. In this case, the temperature of the reactor may be 600° C. to 1,200° C. and preferably 700° C. to 900° C.

When the temperature of the reactor is less than 600° C., since the catalyst is poorly dried, there may be an economic disadvantage in that an additional process is required, and the purity or physical properties of the prepared carbon nanotubes may be adversely affected. On the other hand, when the temperature of the reactor is more than 1,200° C., not only economic loss may be caused because excessive costs are required to build equipment or a system, but also the performance of the catalyst may be degraded due to the formation of a solid solution or the deformation of the crystal structure.

Still another aspect of the present invention provides a carbon nanotube aggregate, which includes a bundle-type carbon nanotube consisting of a plurality of multi-walled carbon nanotubes grown on the catalyst for preparing multi-walled carbon nanotubes.

Basically, the bundle-type carbon nanotube may be present in the form of an aggregate formed of a plurality of carbon nanotubes and preferably an aggregate formed of a plurality of multi-walled carbon nanotubes. Each of the carbon nanotubes and an aggregate thereof may be of a straight-type, a curved-type, or a combination of a straight-type and a curved-type.

The bundle-type carbon nanotube may have an average bundle diameter of 0.5 μm to 20 μm and an average bundle length of 10 μm to 200 μm. In addition, the multi-walled carbon nanotube may have an intensity ratio ($I_G/I_D$) of 0.7 to 1.5 as measured by Raman spectroscopy, an average diameter of 5 nm to 50 nm, and an apparent density of 0.01 g/mL to 0.07 g/mL.

Hereinafter, Examples of the present invention will be described in detail.

EXAMPLES AND COMPARATIVE EXAMPLES

A precursor solution was prepared by dissolving each precursor among $Fe(NO_3)_3 \cdot 9H_2O$, $Co(NO_3)_3 \cdot 6H_2O$, $(NH_4)_6Mo_7O_{24} \cdot 4H_2O$, $NH_4VO_3$, $(NH_4)_{10}H_2(W_2O_7)_6 \cdot 9H_2O$, $Al(NO_3)_3 \cdot 9H_2O$, $Mg(NO_3)_2 \cdot 6H_2O$, and $ZrO(NO_3)_2 \cdot 2H_2O$ in deionized water, which is required for a catalyst composition shown in the following Table 1. A catalyst powder was obtained by subjecting the precursor solution to thermal decomposition by spraying the same into a reactor at a rate of 3 L/hr along with air. Here, the thermal decomposition was carried out continuously for 120 minutes under conditions of an air pressure of 3 atm and a reactor internal temperature of 750° C.

TABLE 1

| Classification | Catalyst composition | Ma (number of moles) | | | | | Mb (number of moles) | | | Ma in total | Mb in total | x (mole fraction) | y (mole fraction) |
|---|---|---|---|---|---|---|---|---|---|---|---|---|---|
| | | Fe | Co | Mo | V | W | Al | Mg | Zr | | | | |
| Example 1 | Fe/Al/Mg | 71.6 | — | — | — | — | 148.2 | 82.3 | — | 71.6 | 230.5 | 2.37 | 7.63 |
| Example 2 | Fe/Mo/Al/Mg | 88.6 | — | 5.2 | — | — | 183.5 | 4.1 | — | 93.8 | 187.6 | 3.33 | 6.67 |
| Example 3 | Co/V/Al/Mg | — | 118.8 | — | 9.8 | — | 148.2 | 41.1 | — | 128.6 | 189.4 | 4.04 | 5.96 |
| Example 4 | Fe/Co/Mo/Al | 47.0 | 14.8 | 5.2 | — | — | 185.3 | — | — | 67.1 | 185.3 | 2.66 | 7.34 |
| Example 5 | Fe/Co/Mo/Al | 67.1 | 21.2 | 5.2 | — | — | 185.3 | — | — | 93.6 | 185.3 | 3.36 | 6.64 |
| Example 6 | Fe/Co/Mo/Al | 94.0 | 29.7 | 5.2 | — | — | 185.3 | — | — | 128.9 | 185.3 | 4.10 | 5.90 |
| Example 7 | Fe/Co/Mo/Al/Mg | 67.1 | 21.2 | 5.2 | — | — | 185.3 | 4.1 | — | 93.6 | 189.4 | 3.31 | 6.69 |
| Example 8 | Fe/Co/Mo/V/Al | 134.3 | 42.4 | 5.2 | 0.6 | — | 185.3 | — | — | 182.5 | 185.3 | 4.96 | 5.04 |
| Example 9 | Co/V/W/Al | — | 118.8 | — | 9.8 | 8.2 | 148.2 | — | — | 136.8 | 148.2 | 4.80 | 5.20 |
| Example 10 | Co/V/Al/Zr | — | 237.6 | — | 17.7 | — | 74.1 | — | 21.9 | 255.2 | 96.0 | 7.27 | 2.73 |
| Comparative Example 1 | Fe/Al/Mg | 53.7 | — | — | — | — | 148.2 | 82.3 | — | 53.7 | 230.5 | 1.89 | 8.11 |
| Comparative Example 2 | Fe/Co/Mo/Al | 143.2 | 67.9 | 20.8 | — | — | 74.1 | — | — | 231.9 | 74.1 | 7.58 | 2.42 |
| Comparative Example 3 | Fe/Co/Mo | 67.1 | 21.2 | 5.2 | — | — | — | — | — | 93.6 | 0.0 | 10.00 | 0.00 |
| Comparative Example 4 | Al/Mg | — | — | — | — | — | 74.1 | 41.1 | — | 0.0 | 115.3 | 0.00 | 10.00 |
| Comparative Example 5 | Fe/Co/Mo/Al | 67.1 | 21.2 | 5.2 | — | — | 185.3 | — | — | 93.6 | 185.3 | 3.36 | 6.64 |
| Comparative Example 6 | Fe/Co/Mo/Al | 67.1 | 21.2 | 5.2 | — | — | 185.3 | — | — | 93.6 | 185.3 | 3.36 | 6.64 |
| Comparative | Fe/Co/Mo/Al | 67.1 | 21.2 | 5.2 | — | — | 185.3 | — | — | 93.6 | 185.3 | 3.36 | 6.64 |

TABLE 1-continued

| Classification | Catalyst composition | Ma (number of moles) | | | | | Mb (number of moles) | | | Ma in total | Mb in total | x (mole fraction) | y (mole fraction) |
|---|---|---|---|---|---|---|---|---|---|---|---|---|---|
| | | Fe | Co | Mo | V | W | Al | Mg | Zr | | | | |
| Example 7 Comparative Example 8 | Fe/Co/Mo/Al | 67.1 | 21.2 | 5.2 | — | — | 185.3 | — | — | 93.6 | 185.3 | 3.36 | 6.64 |

Figure 2:
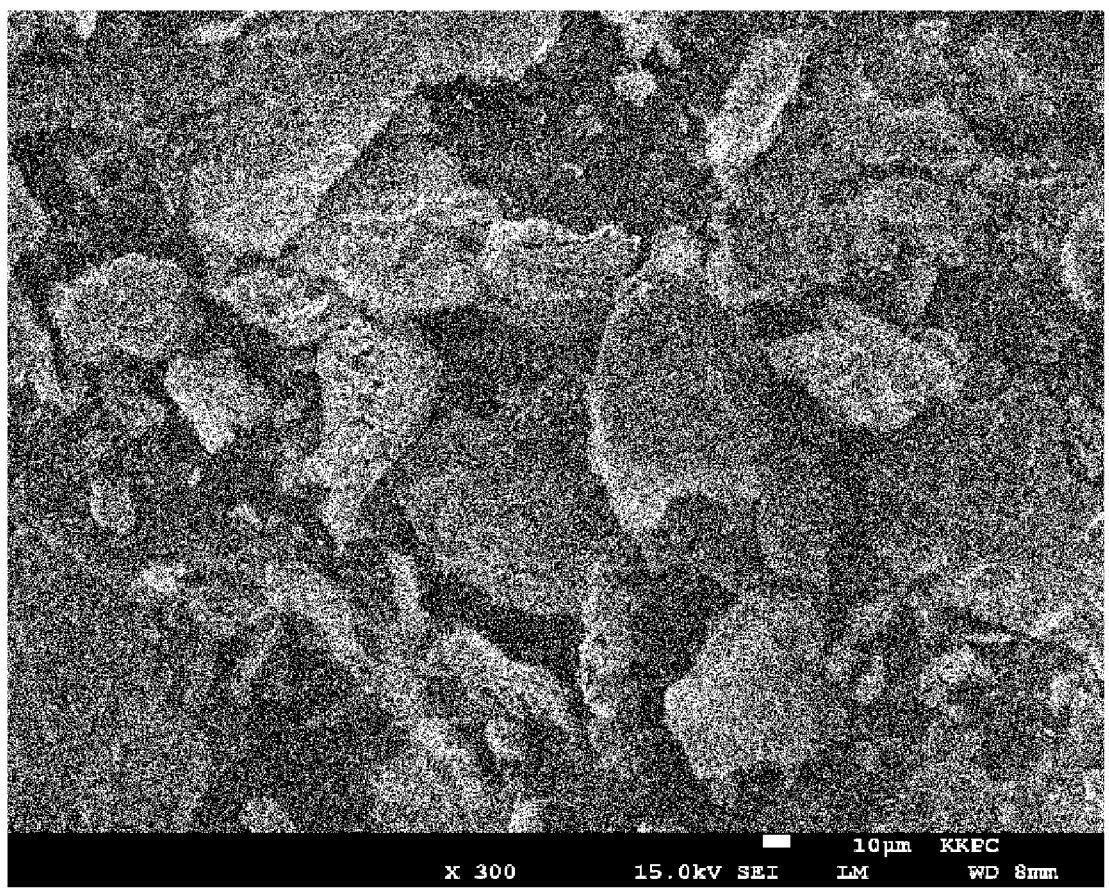
FIG. 2 is an SEM image of a catalyst for preparing multi-walled carbon nanotubes according to a Comparative Example of the present invention.

The catalysts according to Comparative Example 5 and Example 5 had the same components and compositions but were prepared by different methods, wherein the catalyst according to Comparative Example 5 was prepared by spray drying. Specifically, in the case of Comparative Example 5, to prepare a catalyst powder in the form of a solid sphere, a catalyst powder was prepared by spraying a precursor solution into a reactor of 200° C., which is significantly lower than the temperature of spray pyrolysis used for Example 5, and then subjected to heat treatment in a heat-treatment furnace under an air atmosphere for one hour at 700° C. The catalysts according to Comparative Examples 6 and 7, which were prepared by co-precipitation and combustion, respectively, have a plate shape as shown in FIG. 2. The catalyst according to Comparative Example 8 is a catalyst prepared using a completely water-insoluble alumina ($Al_2O_3$) powder as the precursor of Al among the catalyst components.

FIGS. 1 and 2 are the SEM images of catalysts for preparing multi-walled carbon nanotubes according to an Example and a Comparative Example, respectively.

First, referring to FIG. 1, it can be seen that all of the catalyst powder according to Example 1 has a spherical core-shell structure or a partially broken spherical structure, and in particular, in all cases where the catalyst powder has a partially broken spherical structure, the catalyst powder is present in the form of a thin piece in which 50% or more of the shell consisting of metal components and constituting the surface of the hollow structure has been formed.

On the other hand, referring to FIG. 2, it can be seen that the catalyst powders according to Comparative Examples 6 and 7 do not actually have a hollow structure, judging from their very uneven shape compared to Example 1 and the fact that no catalyst powder with a completely spherical core-shell structure is observed and that the thin pieces appear to have a flat shape or a curved shape with a certain curvature.

Experimental Example

Carbon nanotubes were synthesized using the catalyst powders according to the Examples and the Comparative Examples. Specifically, each type of catalyst powder was introduced into a fluidized-bed chemical vapor deposition reactor having a diameter of 350 mm, and the temperature was raised to a temperature of 700° C. to 800° C. under a nitrogen atmosphere and maintained. Subsequently, a mixed gas of nitrogen and ethylene was allowed to react therewith for 40 minutes while supplying the same at a rate of 150 L/min, and thereby carbon nanotubes grown on each type of catalyst powder were synthesized.

The apparent density of each type of catalyst powder was calculated by dividing the weight of the catalyst powder, which was measured by filling a mass cylinder with the same, by the volume of the mass cylinder, and the apparent density of carbon nanotubes was determined in the same manner. In addition, the synthesis yield of carbon nanotubes was calculated according to the equation: "weight of synthesized carbon nanotubes (g)]/[weight of introduced catalyst powder (g)]×100." The results are shown in the following Table 2.

TABLE 2

| Classification | Apparent density of catalyst powder (g/mL) | Synthesis yield of carbon nanotubes (%) | Apparent density of carbon nanotubes (g/mL) |
|---|---|---|---|
| Example 1 | 0.180 | 1,264 | 0.015 |
| Example 2 | 0.060 | 1,490 | 0.022 |
| Example 3 | 0.516 | 1,400 | 0.020 |
| Example 4 | 0.077 | 1,354 | 0.020 |
| Example 5 | 0.072 | 1,437 | 0.022 |
| Example 6 | 0.084 | 2,600 | 0.023 |
| Example 7 | 0.090 | 1,392 | 0.015 |
| Example 8 | 0.215 | 4,282 | 0.027 |
| Example 9 | 0.369 | 3,855 | 0.031 |
| Example 10 | 0.662 | 4,030 | 0.034 |
| Comparative Example 1 | 0.164 | 651 | 0.008 |
| Comparative Example 2 | 0.470 | 967 | 0.029 |
| Comparative Example 3 | 0.437 | 826 | 0.076 |
| Comparative Example 4 | 0.906 | 0 | — |
| Comparative Example 5 | 0.815 | 763 | 0.053 |
| Comparative Example 6 | 0.726 | 582 | 0.013 |
| Comparative Example 7 | 0.028 | 594 | 0.007 |
| Comparative Example 8 | 1.056 | 742 | 0.012 |

Referring to Table 2, it can be seen that the synthesis of carbon nanotubes in a fluidized-bed chemical vapor deposition reactor using a catalyst according to Examples 1 to 10 can realize a high synthesis yield of 1,200% or more and thus is suitable for the mass production of carbon nanotubes. However, it can be seen that the use of a catalyst according to a Comparative Example is not suitable for mass production because a carbon nanotube synthesis yield of less than 1,000% is obtained, and thus the catalysts according to the Comparative Examples are not a type suitable for a fluidized-bed chemical vapor deposition reactor. In particular, in the case of the catalysts according to Comparative Examples 4, 5, 6, and 8, where the catalyst powder has an apparent density of 0.70 g/mL or more, there is a difficulty in causing the catalyst to float by the fluidized-bed chemical vapor deposition method in which carbon nanotubes are synthesized while a catalyst powder is caused to float by a reaction gas.

The foregoing description of the present invention is intended for illustration, and it will be understood by those skilled in the art to which the invention pertains that the invention can be easily modified and implemented in various other forms without changing the technical spirit or essential features of the invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the invention.

The invention claimed is:

1. A catalyst for preparing multi-walled carbon nanotubes, the catalyst having a hollow structure with a thickness of 0.5 μm to 10 μm and consisting of Ma and Mb according to the following Equation:

$$Ma:Mb=x:y, \qquad \text{<Equation>}$$

wherein:
Ma represents two or more metals selected from among Fe, Ni, Co, Mn, Cr, Mo, V, W, Sn, and Cu;
Mb is one or more metals selected from among Al, Si, and Zr;
x and y represent mole fractions of Ma and Mb, respectively; and
x+y=10, 4.10≤x≤7.27, and 2.73≤y≤5.90, and
wherein the catalyst has an apparent density of 0.084 g/mL to 0.662 g/mL.

2. The catalyst of claim 1, wherein the thickness of the catalyst is 1 μm to 8 μm.

3. The catalyst of claim 1, wherein the hollow structure has a hollow ratio of 50 vol % or more.

4. A carbon nanotube aggregate, which comprises a bundle carbon nanotube consisting of a plurality of multi-walled carbon nanotubes grown on the catalyst of claim 1.

5. The carbon nanotube aggregate of claim 4, wherein the bundle carbon nanotube has an average bundle diameter of 0.5 μm to 20 μm and an average bundle length of 10 μm to 200 μm.

6. The carbon nanotube aggregate of claim 4, wherein the multi-walled carbon nanotubes have an intensity ratio (IG/ID) of 0.7 to 1.5 as measured by Raman spectroscopy.

7. The carbon nanotube aggregate of claim 4, wherein the multi-walled carbon nanotubes have an average diameter of 5 nm to 50 nm.

8. The carbon nanotube aggregate of claim 4, wherein the multi-walled carbon nanotubes have an apparent density of 0.01 g/mL to 0.07 g/mL.

9. A catalyst for preparing multi-walled carbon nanotubes, the catalyst having a hollow structure with a thickness of 0.5 μm to 10 μm for synthesis of carbon nanotube in a high yield of 2,600-4,282%, wherein the yield is the weight of synthesized carbon nanotube divided by the weight of introduced catalyst and multiplied by 100, and comprising metal components according to the following Equation:

$$Ma:Mb=x:y, \qquad \text{<Equation>}$$

wherein:
Ma represents two or more metals selected from among Fe, Ni, Co, Mn, Cr, Mo, V, W, Sn, and Cu;
Mb is one or more metals selected from among Al, Si, and Zr;
x and y represent mole fractions of Ma and Mb, respectively; and
x+y=10, 4.10≤x≤7.27, and 2.73≤y≤5.90, and
wherein the catalyst has an apparent density of 0.084 g/mL to 0.662 g/mL, and
wherein the catalyst is selected from among the following metal component compositions:
Fe, Co, Mo, and Al;
Fe, Co, Mo, V, and Al;
Co, V, W, and Al; and
Co, V, Al, and Zr.

\* \* \* \* \*